(12) United States Patent
Choi

(10) Patent No.: US 9,041,345 B2
(45) Date of Patent: May 26, 2015

(54) BATTERY SYSTEM AND ENERGY STORAGE SYSTEM INCLUDING SAME

(75) Inventor: Sun-Ho Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 440 days.

(21) Appl. No.: 13/615,242

(22) Filed: Sep. 13, 2012

(65) Prior Publication Data

US 2013/0234671 A1 Sep. 12, 2013

Related U.S. Application Data

(60) Provisional application No. 61/609,727, filed on Mar. 12, 2012.

(51) Int. Cl.
*H02J 7/00* (2006.01)
*H01M 10/48* (2006.01)

(52) U.S. Cl.
CPC ............ *H02J 7/0016* (2013.01); *H01M 10/482* (2013.01)

(58) Field of Classification Search
USPC ......... 320/107–108, 116–121, 124–125, 128, 320/152
See application file for complete search history.

(56) References Cited

U.S. PATENT DOCUMENTS

| | | |
|---|---|---|
| 2010/0225275 A1 | 9/2010 | Bucur et al. |
| 2010/0295509 A1 | 11/2010 | Moussaoui et al. |
| 2013/0057200 A1* | 3/2013 | Potts et al. ............. 320/107 |
| 2013/0175867 A1 | 7/2013 | Park |

FOREIGN PATENT DOCUMENTS

| | | |
|---|---|---|
| JP | 2011-268815 A | 9/2001 |
| JP | 2003-158828 A | 5/2003 |
| JP | 2010-004679 A | 1/2010 |
| JP | 2010-124682 A | 6/2010 |
| JP | 2011-120456 A | 6/2011 |
| KR | 10-2007-0111587 A | 11/2007 |
| KR | 10-2010-0029058 A | 3/2010 |
| KR | 10-2010-0126235 A | 12/2010 |

OTHER PUBLICATIONS

Korean Office Action dated Oct. 1, 2013 for Korean Patent Application No. KR 10-2012-0100647, which claims priority from U.S. Appl. No. 61/609,727, filed Mar. 12, 2012, and captioned U.S. Appl. No. 13/615,242.

* cited by examiner

*Primary Examiner* — Paul Dinh
(74) *Attorney, Agent, or Firm* — Knobbe, Martens, Olson & Bear, LLP

(57) ABSTRACT

A battery system is disclosed. The battery system includes a plurality of battery cells, and a battery cell balancing unit, configured to adjust voltages across each of the battery cells to reduce variation among the voltages across the battery cells. The battery cell balancing unit includes a controller configured to receive a DC reference current and to generate an AC current based on the DC reference current, a transformer, a rectifier circuit including a rectifier connected to the output coil, and a switching unit including a plurality of switches, each configured to selectively connect the rectifier to one of the battery cells.

24 Claims, 8 Drawing Sheets

BATTERY SYSTEM AND ENERGY STORAGE SYSTEM INCLUDING SAME

REFERENCE TO RELATED APPLICATIONS

This application claims priority to U.S. Provisional No. 61/609,727, titled "BATTERY SYSTEM AND ENERGY STORAGE SYSTEM INCLUDING SAME" filed Mar. 12, 2012, which is hereby incorporated by reference in its entirety.

BACKGROUND

1. Field

The disclosed technology relates to a battery system and an energy storage system including the battery system.

2. Description of the Related Technology

As problems such as environmental pollution and resource exhaustion have increased, the interest in systems for storing energy and efficiently using the stored energy has also increased. There is also increased interest in renewable energy that does not cause pollution or that causes little pollution during power generation. Thus, research into energy storage systems which may be used with renewable energy sources, power storage battery systems, and existing grid power has been actively conducted as changes occur in the environment.

Battery systems may be supplied with external power, store the supplied power, and externally supply the stored power. That is, battery systems may perform charging and discharging operations. Many attempts have been made to stably perform charging and discharging operations by efficiently controlling battery systems.

SUMMARY OF CERTAIN INVENTIVE ASPECTS

One inventive aspect is a battery system. The battery system includes a plurality of battery cells, and a battery cell balancing unit configured to adjust voltages across each of the battery cells to reduce variation among the voltages across the battery cells. The battery cell balancing unit includes a controller configured to receive a DC reference current and to generate an AC current based on the DC reference current, and a transformer having an input coil configured to receive the AC current, and an output coil coupled to the input coil. The battery cell balancing unit also includes a rectifier circuit having a rectifier connected to the output coil, and a switching unit including a plurality of switches, each configured to selectively connect the rectifier to one of the battery cells.

Another inventive aspect is an energy storage system, which includes a battery system having a plurality of battery cells, and a battery cell balancing unit. The battery cell balancing unit is configured to adjust voltages across each of the battery cells to reduce variation among the voltages across the battery cells. The battery cell balancing unit includes the battery cell balancing unit includes a controller configured to receive a DC reference current and to generate an AC current based on the DC reference current, and a transformer having an input coil configured to receive the AC current, and an output coil coupled to the input coil. The battery cell balancing unit also includes a rectifier circuit having a rectifier connected to the output coil, and a switching unit including a plurality of switches, each configured to selectively connect the rectifier to one of the battery cells. The battery system also includes a power conversion system, including a controller, configured to charge the battery system with power from either a power generation system or a grid, and to discharge the battery system by providing power from the battery system to a load.

DETAILED DESCRIPTION OF CERTAIN INVENTIVE EMBODIMENTS

Figure 1:
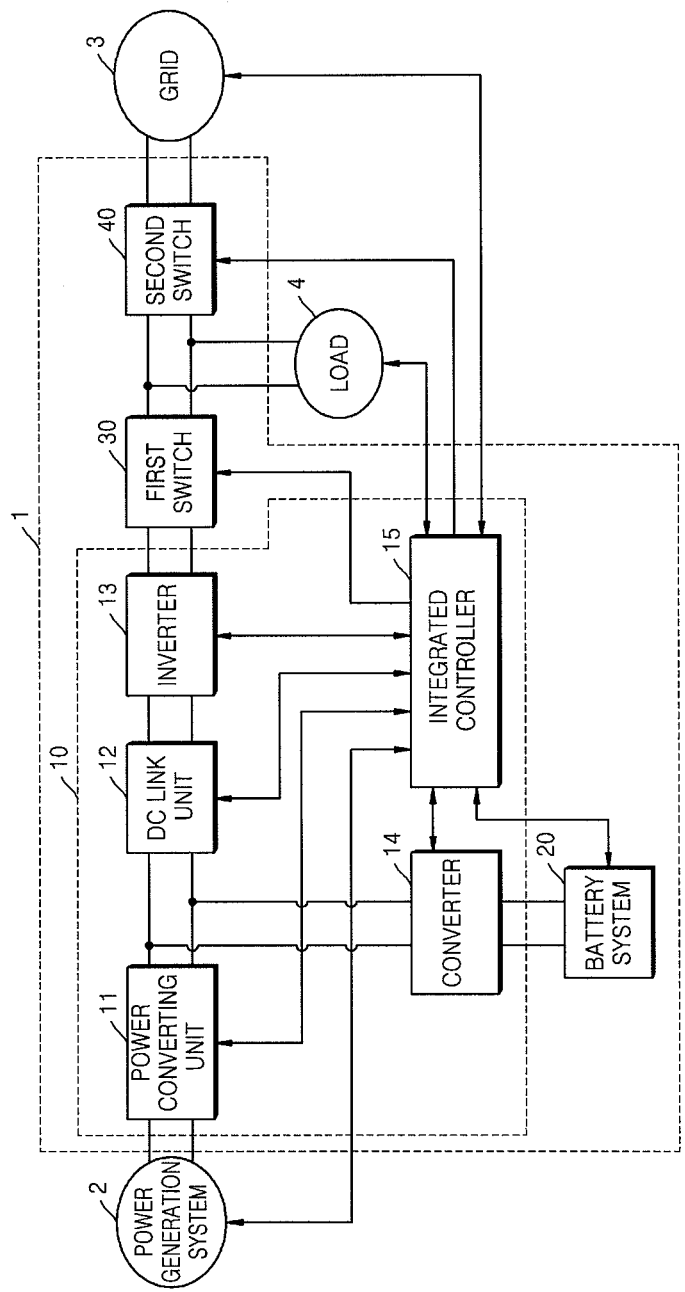
FIG. 1 is a block diagram of an energy storage system according to an embodiment.

Reference will now be made in detail to embodiments, examples of which are illustrated in the accompanying drawings, wherein like reference numerals generally refer to the like elements throughout.

Various changes and numerous embodiments may be practiced. Certain embodiments are illustrated in the drawings and described in detail in the written description. However, this is not intended to limit the present invention to particular modes of practice, and it is to be appreciated that various changes, equivalents, and substitutes are encompassed in the present invention.

While such terms as "first," "second," etc., may be used to describe various components, such components must not be limited to the above terms. The above terms may be used only to distinguish one component from another.

The terms used in the present specification are used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added or also included.

Reference is made in detail to certain embodiments, examples of which are illustrated in the accompanying drawings. In the drawings, the same elements generally are denoted by the same reference numerals, and a repeated explanation thereof may not be given.

FIG. 1 is a block diagram of an energy storage system 1 according to an embodiment. Referring to FIG. 1, the energy storage system 1 is used with a power generation system 2 and a grid 3 to supply power to a load 4.

The power generation system 2 is a system that generates power by using an energy source. The power generation system 2 generates power and supplies the power to the energy storage system 1. The power generation system 2 may, for example, be a solar power generation system, a wind power generation system, or a tidal power generation system. However, the solar power generation system, the wind power generation system, and the tidal power generation system are exemplary and the power generation system 2 is not limited thereto. The power generation system 2 may, for example, be any power generation system that generates power using renewable energy such as solar heat or geothermal heat. In particular, a solar cell for generating electrical energy by using sunlight may be applied to the energy storage system 1, which may be distributed, for example, in houses and factories, because it is easy to install the solar cell therein. The power generation system 2 may act as a high-capacity energy system by generating power by using a plurality of power generation modules that are arranged in parallel.

The grid 3 includes a power plant, a substation, power lines, and the like. If the grid 3 is in a normal state, the grid 3 either supplies power to the energy storage system 1 to supply the power to the load 4 and/or a battery system 20, or receives power from the energy storage system 1. If the grid 3 is in an abnormal state, the grid 3 does not supply power to the energy storage system 1, and the energy storage system 1 stops supplying power to the grid 3.

The load 4 consumes power generated by the power generation system 2, power stored in the battery system 20, or power supplied from the grid 3. A house or a factory may, for example, be or include the load 4.

The energy storage system 1 may store power generated by the power generation system 2 in the battery system 20, and supply the generated power to the grid 3. The energy storage system 1 may supply power stored in the battery system 20 to the grid 3, or store power supplied from the grid 3 in the battery system 20. In an abnormal situation, for example, if there is a power failure in the grid 3, the energy storage system 1 may supply power to the load 4 by performing an uninterruptible power supply (UPS) operation. Even if the grid 3 is in a normal state, the energy storage system 1 may supply power generated by the power generation system 2 or power stored in the battery system 20 to the load 4.

The energy storage system 1 includes a power conversion system (PCS) 10 that controls power conversion, the battery system 20, a first switch 30, a second switch 40, etc. The PCS 10 converts power of the power generation system 2, the grid 3, and the battery system 20 into suitable power and supplies the converted power to where needed. The PCS 10 includes a power converting unit 11, a direct current (DC) link unit 12, an inverter 13, a converter 14, and an integrated controller 15.

The power converting unit 11 is connected between the power generation system 2 and the DC link unit 12. The power converting unit 11 delivers power generated by the power generation system 2 to the DC link unit 12. The output voltage of the power from the power converting unit 11 is a DC link voltage.

The power converting unit 11 may include a power conversion circuit, such as a converter or a rectifier circuit, according to the type of the power generation system 2. If the power generation system 2 generates DC power, the power converting unit 11 may include a converter for converting the DC power to DC power. Alternatively, if the power generation system 2 generates alternating current (AC) power, the power converting unit 11 may include a rectifier circuit for converting the AC power to DC power. In particular, if the power generation system 2 is a solar power generation system, the power converting unit 11 may include a maximum power point tracking (MPPT) converter so as to obtain maximum power output from the power generation system 2 according to change in solar radiation, temperature, or the like. When the power generation system 2 generates no power, the power converting unit 11 may stop operating and minimize power consumption of a converter included in the power converting unit 11 or the like.

A level of the DC link voltage may become unstable due to an instantaneous voltage drop in the power generation system 2 or the grid 3 or a spike in demand in the load 4. However, the DC link voltage needs to be stabilized to normally operate the inverter 13 and the converter 14. The DC link unit 12 is connected between the power converting unit 11 and the inverter 13 and maintains the DC link voltage. The DC link unit 12 may be, for example, a large-capacity storage capacitor.

The inverter 13 is a power converter connected between the DC link unit 12 and the first switch 30. The inverter 13 may include an inverter that converts the DC link voltage output from the power generation system 2 and/or the battery system 20 into an AC voltage for the grid 3 and outputs the AC voltage in a discharging mode. The inverter 13 may include a rectifier circuit that rectifies an AC voltage output from the grid 3 into the DC link voltage to be stored in the battery system 20 in a charging mode.

The inverter 13 may be a bidirectional inverter in which directions of input and output are changeable. Alternatively, the inverter 13 may include a plurality of inverters such that directions of input and output are changeable.

The inverter 13 may include a filter for removing harmonics from the AC voltage output to the grid 3, and a phase-locked loop (PLL) circuit for matching a phase of the AC voltage output from the inverter 13 to a phase of the AC voltage of the grid 3 in order to prevent reactive power loss. Also, the inverter 13 may perform other functions such as restriction of voltage variation range, power factor correction, removal of DC components, and protection against transient phenomenon. When the inverter 30 is not used, the operation of the inverter 13 may be stopped so as to minimize power consumption.

The converter 14 is a power converter that is connected between the DC link unit 12 and the battery system 20. The converter 14 includes a converter that performs DC-DC conversion by converting a voltage of power output from the battery system 20 into the DC link voltage that is required by the inverter 13 in a discharging mode. Also, the converter 14 includes a converter that performs DC-DC conversion by converting a voltage of power output from the power converting unit 11 or the inverter 13 into a charge voltage for the battery system 20 in a charging mode. When there is no need to charge or discharge the battery system 20, the operation of the converter 14 may be stopped so as to minimize power consumption.

The converter 14 may be a bidirectional converter in which directions of input and output are changeable. Alternatively, the converter 14 may include a plurality of converters such that directions of input and output are changeable.

The integrated controller 15 monitors states of the power generation system 2, the grid 3, the battery system 20, and the load 4, and controls the power converting unit 11, the inverter 13, the converter 14, the battery system 20, the first switch 30, and the second switch 40 according to results of the monitoring. The integrated controller 15 may monitor whether a power failure occurs in the grid 3, whether the power generation system 2 generates power, an amount of power generated by the power generation system 2, a charge state of the battery system 20, an amount of power consumed by the load 4, time, and the like. If power to be supplied to the load 4 from the grid 3 is insufficient, for example, if a power failure occurs in the grid 3, the integrated controller 15 may control the load 4 to determine priorities for devices which use power included in the load 4 and supply power to the devices which use power having high priorities.

The first switch 30 and the second switch 40 are connected in series between the inverter 13 and the grid 3, and control the flow of current between the power generation system 2 and the grid 3 by being turned on or off under the control of the integrated controller 15. The first switch 30 and the second switch 40 may be turned on or off according to states of the power generation system 2, the grid 3, and the battery system 20.

For example, if power of the power generation system 2 and/or the battery system 20 is supplied to the load 4 or power from the grid 3 is supplied to the battery system 20, the first switch 30 is turned on. If power of the power generation system 2 and/or the battery system 20 is supplied to the grid 3 or power from the grid 3 is supplied to the load 4 and/or the battery system 20, the second switch 40 is turned on.

In addition, if there is a power failure in the grid 3, the second switch 40 is turned off and the first switch 30 is turned on. Accordingly, power from the power generation system 2 and/or the battery system 20 may be supplied to the load 4, but may not be supplied to the grid 3, which prevents the energy storage system 1 from operating solely, for example, to prevent a worker who works at a power distribution line of the grid 3 or the like from getting an electric shock due to the power of the energy storage system 1.

Switching devices like relays capable of enduring a large amount of current may be used as the first switch 30 and the second switch 40. The battery system 20 receives and stores power generated by the power generation system 2 and/or power output from the grid 3, and supplies power stored to the load 4 or the grid 3. The battery system 20 may include a portion for storing power and a portion for controlling and protecting the portion for storing power. Hereinafter, the battery system 20 will be described in detail with reference to FIG. 2.

Figure 2:
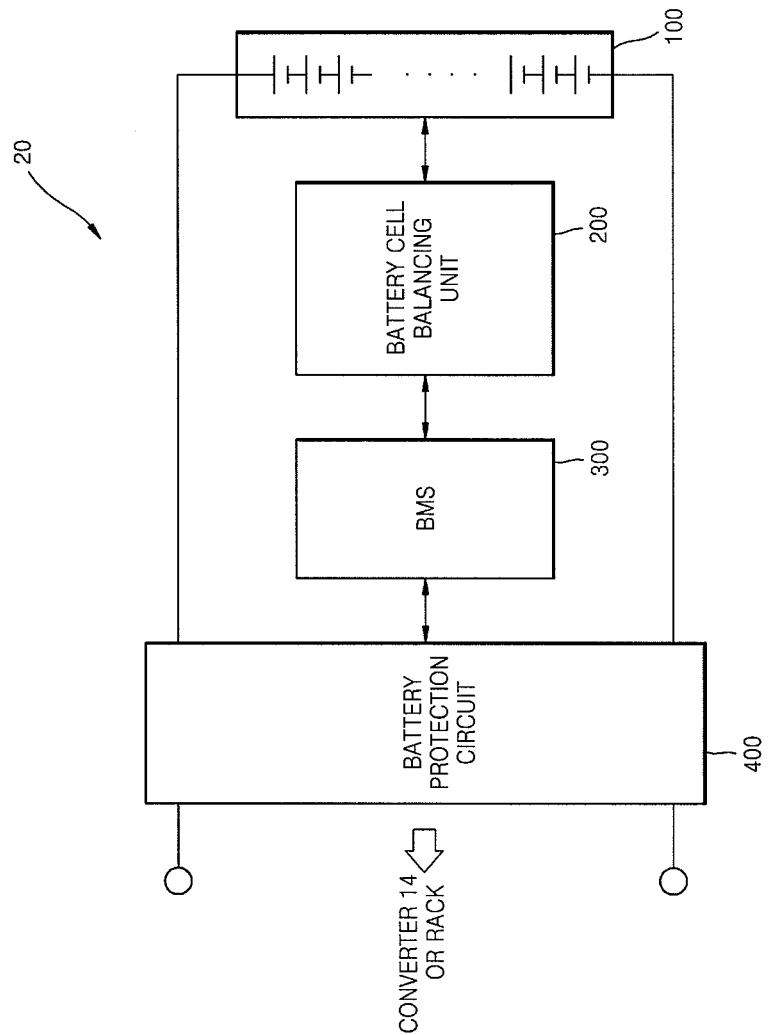
FIG. 2 is a block diagram illustrating a battery system according to an embodiment.

FIG. 2 is a block diagram of the battery system 20 according to an embodiment of the present invention. Referring to FIG. 2, the battery system 20 includes a battery module 100, a battery cell balancing unit 200, a battery management system (BMS) 300, and a battery protection circuit 400.

The battery module 100 stores power supplied from the outside, that is, the power generation system 2 and/or the grid 3, and supplies the power to the load 4 and/or the grid 3. The battery module 100 refers to a structure including a plurality of battery sub-units. For example, the battery system 20 may include a battery rack with a plurality of battery trays. Likewise, the battery system 20 may include a battery tray with a plurality of battery cells.

The battery cell balancing unit 200 is connected to the battery module 100, and compensates for voltage variation of the battery module 100 under the control of the BMS 300 using a multi-output converter. A structure of the battery cell balancing unit 200 is described with reference to FIGS. 3 through 8 below.

The BMS 300 is connected to the battery module 100 and controls charging and discharging operations of the battery module 100. Also, the BMS 300 may perform overcharge protection, over-discharge protection, over-current protection, overvoltage protection, overheat protection, cell balancing, etc. To this end, the BMS 300 may include a measurement unit that measures voltage, current, temperature, a remaining amount of power, lifetime, and a state of charge (SOC) from the battery module 100, generates a control signal according to results of the measurements, and controls the battery protection circuit 400. The BMS 300 may communicate the results of the measurements to the integrated controller 15, and receive one or more commands relating to a controlling the battery module 100 from the integrated controller 15.

The BMS 300, according to some embodiments, outputs a switching signal SW to compensate for a voltage variation of the battery module 100. If the battery module 100 includes a plurality of battery cells, a cell switching signal SW is received in order to select a cell whose voltage variation is to be compensated for. If the battery module 100 includes a plurality of trays, a tray switching signal SW is received in order to select a tray whose voltage variation is to be compensated for.

The battery protection circuit 400 may control a current flow by receiving a control signal from the BMS 300. Also, the battery protection circuit 400 may measure the total output voltage or the total output current of the battery module 100 and transmit a measurement result to the BMS 300. The battery protection circuit 400 may be physically separated from the BMS 300. In other words, the BMS 300 may be separated from the battery protection circuit 400 disposed on a high current path so as to be protected from a current.

Figure 3:
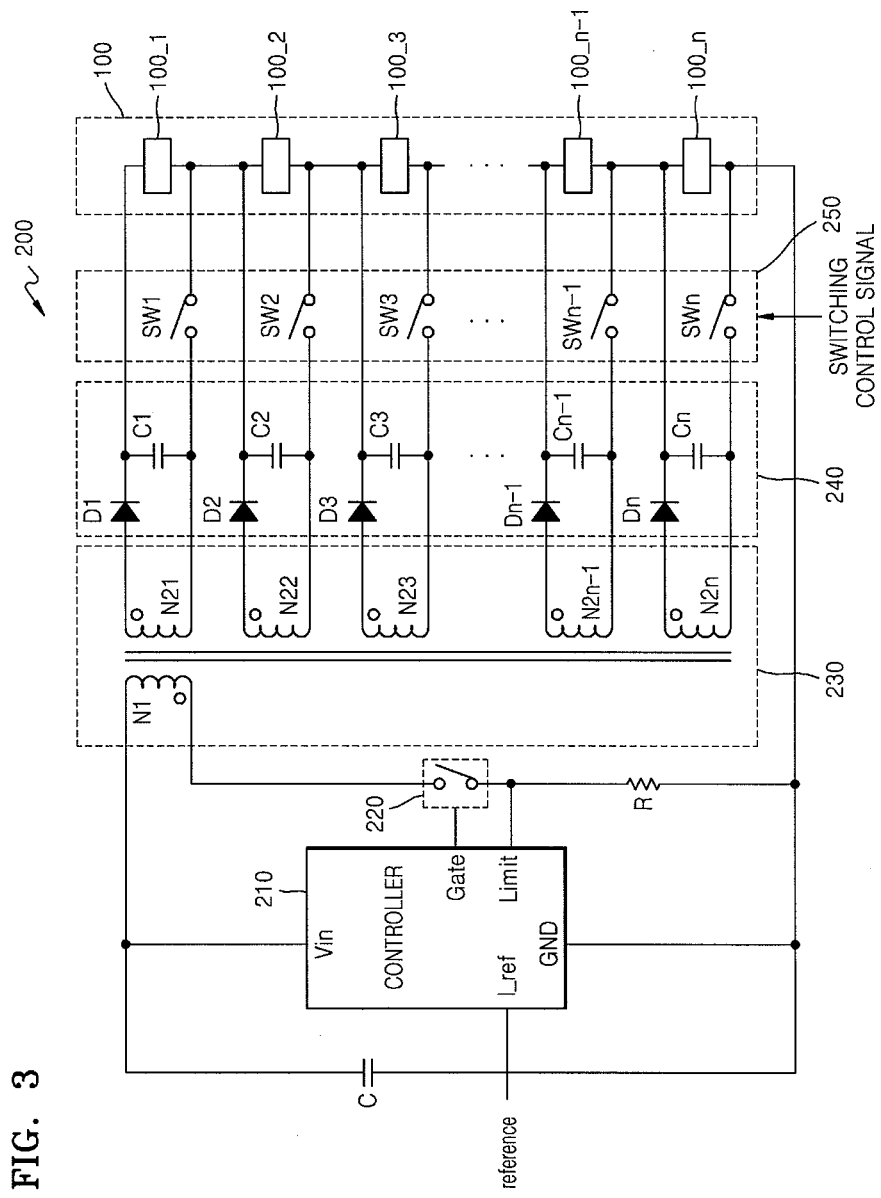
FIG. 3 is a circuit diagram illustrating a voltage variation compensation circuit according to an embodiment.

FIG. 3 is a circuit diagram illustrating a battery cell balancing unit 200 according to an embodiment. Referring to FIG. 3, the voltage variation compensation circuit 200 includes a controller 210, a first switching unit 220, a multi-output transformer 230, a rectifier circuit 240, and a second switching unit 250 via which a rectifier circuit and a battery cell or tray may be selected.

The controller 210 includes a Vin terminal, an I_ref terminal, a GND terminal, a Gate terminal, and a Limit terminal, and receives a reference current from the BMS 300 in order to operate the multi-output transformer 230. A reference current output from the BMS 300 is input to the controller 210 via the I_ref terminal. The reference current is a value that determines an amount of power output from the multi-output transformer 230, and may be a variable value or a fixed value. The controller 210 outputs a power transfer control signal for operating the multi-output converter 300 via the Gate terminal. In addition, the controller 210 senses a current value flowing through a first coil N1 of the multi-output transformer 230 via the Limit terminal so as to monitor whether a current directed by the BMS 300 flows through the first coil N1 of the multi-output transformer 230 or not.

The controller 210 may control a current flowing through the first coil N1 of the multi-output transformer 230 by using a power transfer control signal. Most multi-output converters operate in a voltage controlling method, and if an output of a transformer is high, outputs of a first side and a second side of the transformer may have different couplings. Thus, it is difficult to control each output with the same voltage. However, according to the current embodiment, the multi-output transformer 230 provides power to a desired cell or tray according to a current controlling method at first coil N1 of the multi-output transformer 230, and accordingly, the disadvantage of a voltage variation controlling method where outputs of a transformer are transmitted to different couplings may be prevented.

The first switching unit 220 may be turned on or off by a power transfer control signal output through the Gate terminal of the controller 210. Accordingly, the power transfer control signal may be output to the first switching unit 220 so as to control a current flowing from the Limit terminal through to the first coil N1 of the multi-output transformer 230.

The multi-output transformer 230 may be include a flyback converter that is advantageous at least because of the cost and space configuration as an inductor is not necessary at an output end thereof. By turning on or off the first switching unit 220 according to a power transfer control signal output from the controller 210, an inductive electromotive force may be stopped from being transmitted to second coil N21, N22, . . . , N2n. Then, an alternating current voltage output through the second coil N21, N22, . . . , N2n of the multi-output transformer 230 is converted to a direct current voltage by rectifying diodes D1, D2, . . . , Dn and smoothing capacitors C1, C2, . . . , Cn of the rectifier circuit 240 to be supplied as an output power source so as to be used by battery modules 100_1, 100_2, . . . , 100_n.

The switches SW1, SW2, . . . , SWn of second switching unit 250 switch a direct current power output from the rectifier circuit 240 through the multi-output transformer 230 to be supplied to the battery module 100. The second switching unit SW1, SW2, . . . , SWn 250 is turned on or off by the BMS 300, and only those switching units selected by the BMS 300 are turned on so that a direct current power output from the rectifier circuit 240 through the multi-output transformer 230 is supplied to a selected corresponding cell or tray of the battery modules 100_1, 100_2, . . . , 100_n.

The switches SW1, SW2, . . . , SWn of the second switching unit 250 are maintained in an on state until a voltage variation of the selected cell or tray is compensated for, and the BMS 300 monitors an operation of compensation of the voltage variation, and when the voltage variation of the selected cell or tray is completed, the BMS 300 turns off the second switching unit SW1, SW2, . . . , SWn 250.

An embodiment in which the BMS 300 measures a voltage of a cell or tray of the battery modules 100_1, 100_2, . . . , 100_n and compensates for a voltage variation when a problem occurs at the fourth cell or tray 100_4 and the tenth cell or tray 100_10 is discussed.

The BMS 300 turns on the switch SW4 to compensate for voltage variation of the fourth cell or tray. A power transfer control signal output via the Gate terminal of the controller 210 switches on the first switching unit 220 to allow a current to flow through the multi-output transformer 230. A direct current voltage output from the multi-output transformer 230 is rectified via the rectifier circuit 240 and then is applied to the fourth cell or tray 100_4 via the switch SW4. When a voltage of the fourth cell or tray 100_4 increases to a threshold voltage, the BMS 300 turns off the switch SW4.

In addition, the BMS 300 turns on the switch SW10 to compensate for voltage variation of the tenth cell or tray 100_10. A direct current power output from the multi-output transformer 230 is rectified via the rectifier circuit 240 and then is applied to the then cell or tray 100_10 via the switch SW10. Once a voltage of the tenth cell or tray 100_10 increases to a threshold voltage, the BMS 300 turns off the switch SW10.

As described above, by performing selective compensation of voltage variation, voltage balancing of the battery modules 100_1, 100_2, . . . , 100_n is conducted.

Figure 4:
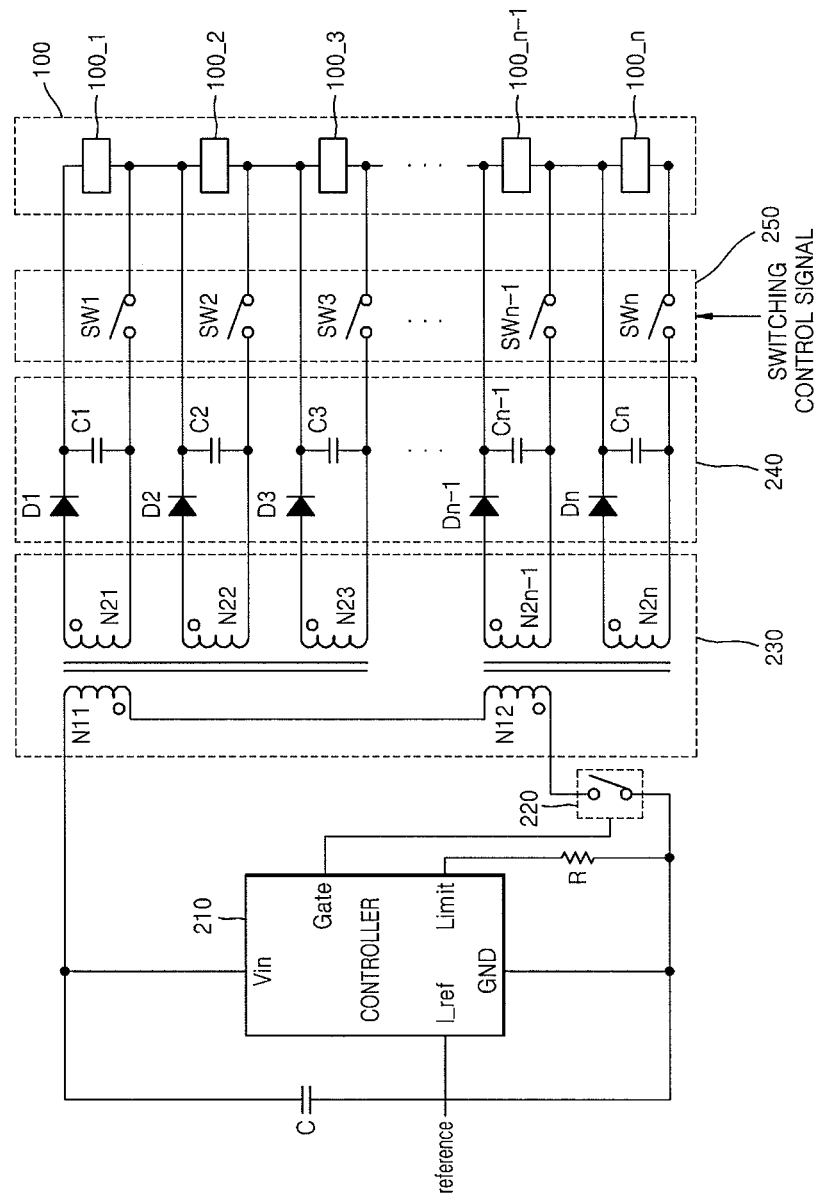
FIG. 4 is a circuit diagram illustrating a voltage variation compensation circuit according to another embodiment.

FIG. 4 is a circuit diagram illustrating a voltage variation compensation circuit according to another embodiment. Compared to the embodiment of FIG. 3, a multi-output transformer 230 of FIG. 4 includes two first coils N11 and N12 serially connected to the first switching unit 220, which operates according to a power transfer control signal output from the controller 210. The rest of the description of the voltage variation compensation circuit of FIG. 4 is similar to that of FIG. 3, and is not repeated.

Figure 5:
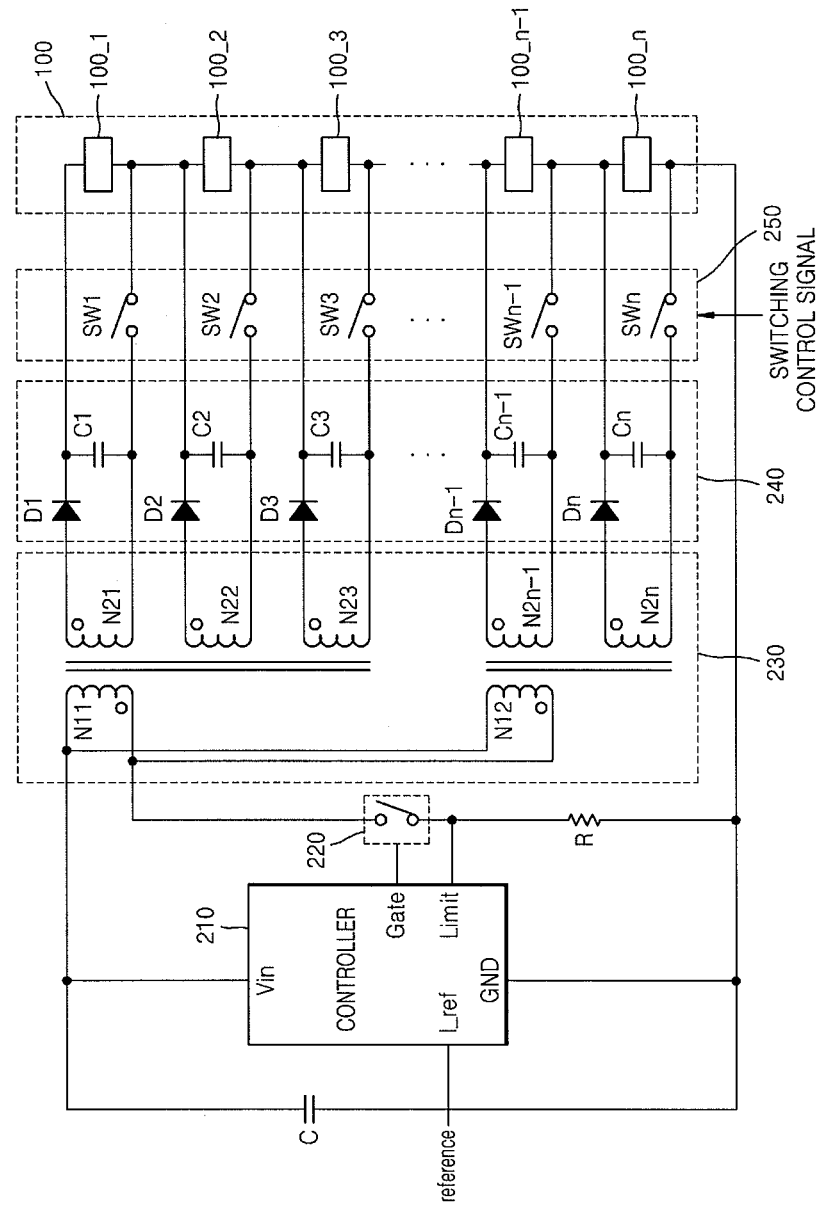
FIG. 5 is a circuit diagram illustrating a voltage variation compensation circuit according to another embodiment.

FIG. 5 is a circuit diagram illustrating a voltage variation compensation circuit according to another embodiment. A multi-output transformer 230 of FIG. 5 includes two first coils N11 and N12 connected to the first switching unit 220 in parallel. The rest of the description of the voltage variation compensation circuit of FIG. 5 is similar to that of FIG. 3, and is not repeated.

Figure 6:
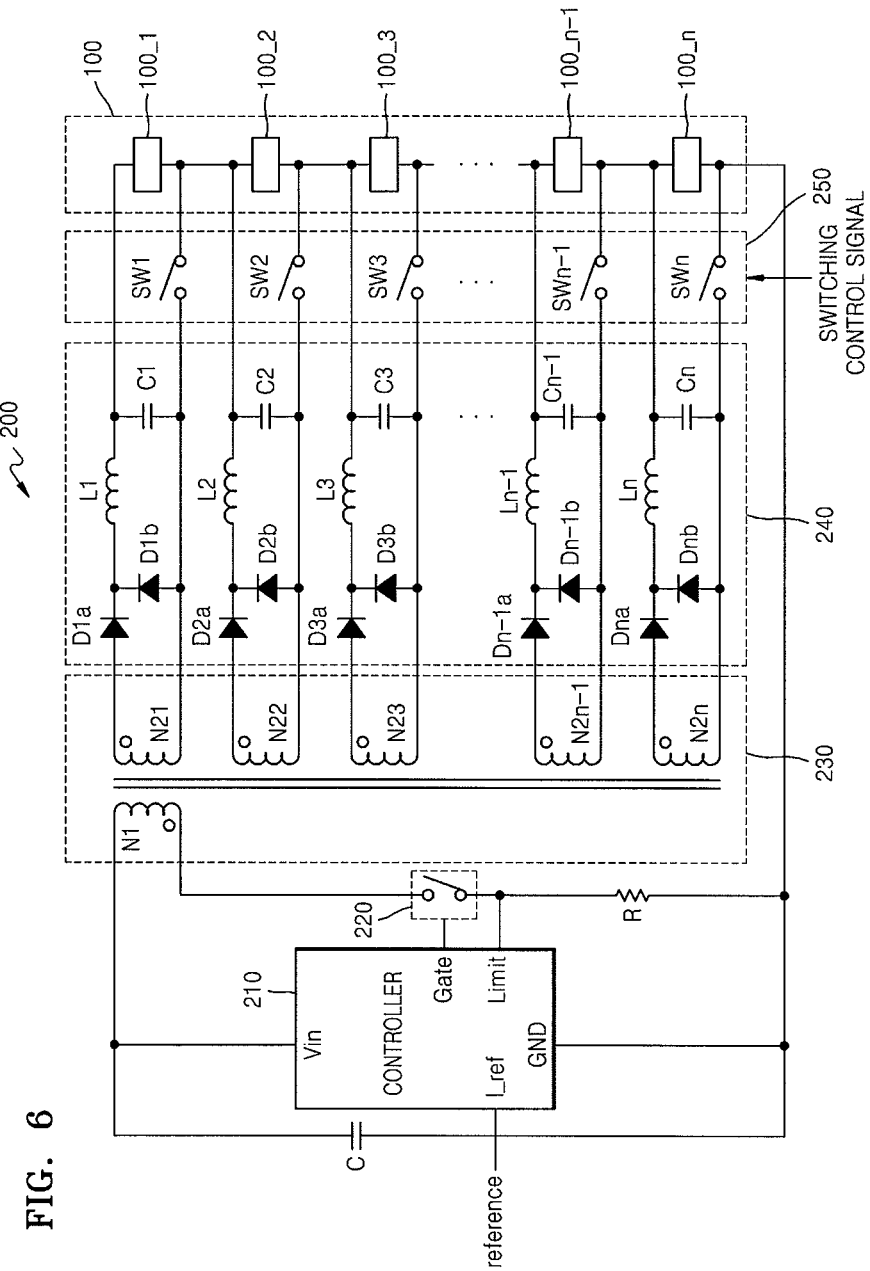
FIG. 6 is a circuit diagram illustrating a voltage variation compensation circuit according to another embodiment of the present invention.

FIG. 6 is a circuit diagram illustrating a voltage variation compensation circuit 200 according to another embodiment. Referring to FIG. 6, the voltage variation compensation circuit 200 includes a controller 210, a first switching unit 220, a multi-output transformer 230, a rectifier circuit 240, and a second switching unit 250.

The controller 210 includes a Vin terminal, an I_ref terminal, a GND terminal, a Gate terminal, and a Limit terminal, and receives a reference current from the BMS 300 in order to operate the multi-output transformer 230. A reference current output from the BMS 300 is input to the controller 210 via the I_ref terminal. The reference current has a value that determines an amount of power output from the multi-output transformer 230, and may be a variable value or a fixed value. The controller 210 outputs a power transfer control signal for operating the first switching unit 220 via the gate terminal. In addition, the controller 210 senses a current value flowing through a first coil N1 of the multi-output transformer 230 via the Limit terminal so as to monitor whether a current directed by the BMS 300 flows through the first coil N1 of the multi-output transformer 230 or not.

The first switching unit 220 may be turned on or off by a power transfer control signal output through the gate terminal of the controller 210. Accordingly, a power transfer control signal may be output to the first switching unit 220 so as to control a current value flowing from the Limit terminal through to the first coil N1 of the multi-output transformer 230.

The multi-output transformer 230 may include a forward converter. By turning on or off the first switching unit 220 according to a power transfer control signal output from the controller 210, an inductive electromotive force may be stopped from being transmitted to a second coil N21, N22, . . . , N2n by the first coil N1 of multi-output transformer 230, first diodes D1a, D2a, . . . , Dna of the rectifier circuit 240 are turned on, second diodes D1b, D2b, . . . , Dnb thereof are shorted. Accordingly, the inductive electromotive force that is stopped from being transmitted to the second coil N21, N22, . . . , N2n accumulates in inductors L1, L2, . . . , Ln via the first diodes D1a, D2a, . . . , Dna.

When the first switching unit 220 is turned off by a power transfer control signal output from the controller 210, the first diodes D1a, D2a, . . . , Dna of the rectifier circuit 240 are shorted, and the second diodes D1b, D2b, . . . , Dnb thereof are open. Accordingly, the inductive electromotive force accumulated in the inductors L1, L2, . . . , Ln are respectively output through the second diodes D1b, D2b, . . . , Dnb. The capacitors C1, C2, . . . , Cn are respectively connected to the inductors L1, L2, . . . , Ln and function as an output filter together with the inductors L1, L2, . . . , Ln.

The switches SW1, SW2, . . . , SWn of second switching unit 250 switch a direct current source output from the rectifier circuit 240 through the multi-output transformer 230 so as to be supplied to the battery module 100. The switches SW1, SW2, . . . , SWn of the second switching unit 250 are turned on or off by the BMS 300, and only those switches selected by the BMS 300 are turned on so that a direct current output from the rectifier circuit 240 through the multi-output transformer 230 is supplied to corresponding cells or trays of the battery modules 100_1, 100_2, . . . , 100_n.

The switches SW1, SW2, . . . , SWn of the second switching unit 250 are maintained in an on state until a voltage variation of the selected cell or tray is compensated for, and the BMS 300 monitors an operation of compensation of the voltage variation, and if the voltage variation of the selected cell or tray is completed, the BMS 300 turns off the switches SW1, SW2, . . . , SWn of the second switching unit 250.

Figure 7:
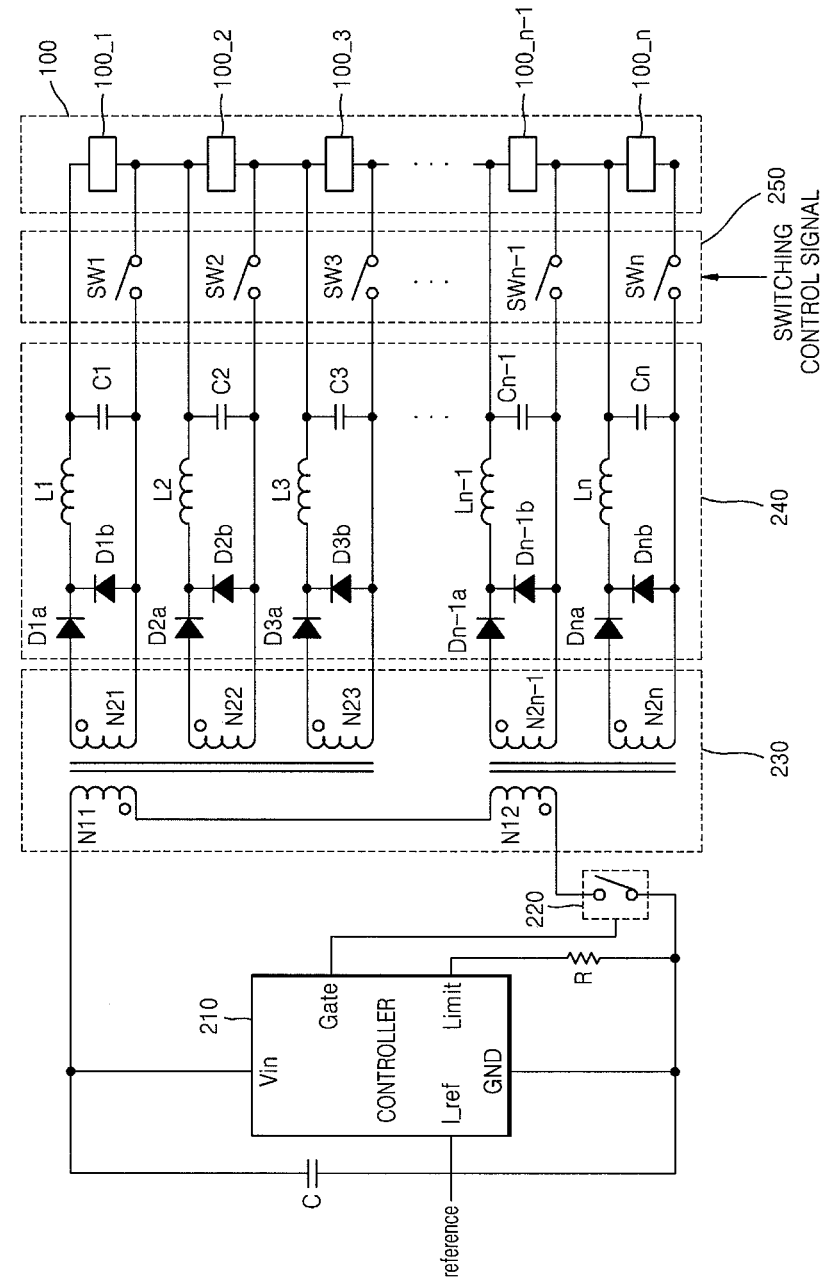
FIG. 7 is a circuit diagram illustrating a voltage variation compensation circuit according to another embodiment.

FIG. 7 is a circuit diagram illustrating a voltage variation compensation circuit according to another embodiment.

A multi-output transformer 230 of FIG. 7 includes two first coils N11 and N12 serially connected to the first switching unit 220. The rest of the description of the voltage variation compensation circuit of FIG. 7 is similar to that presented above.

Figure 8:
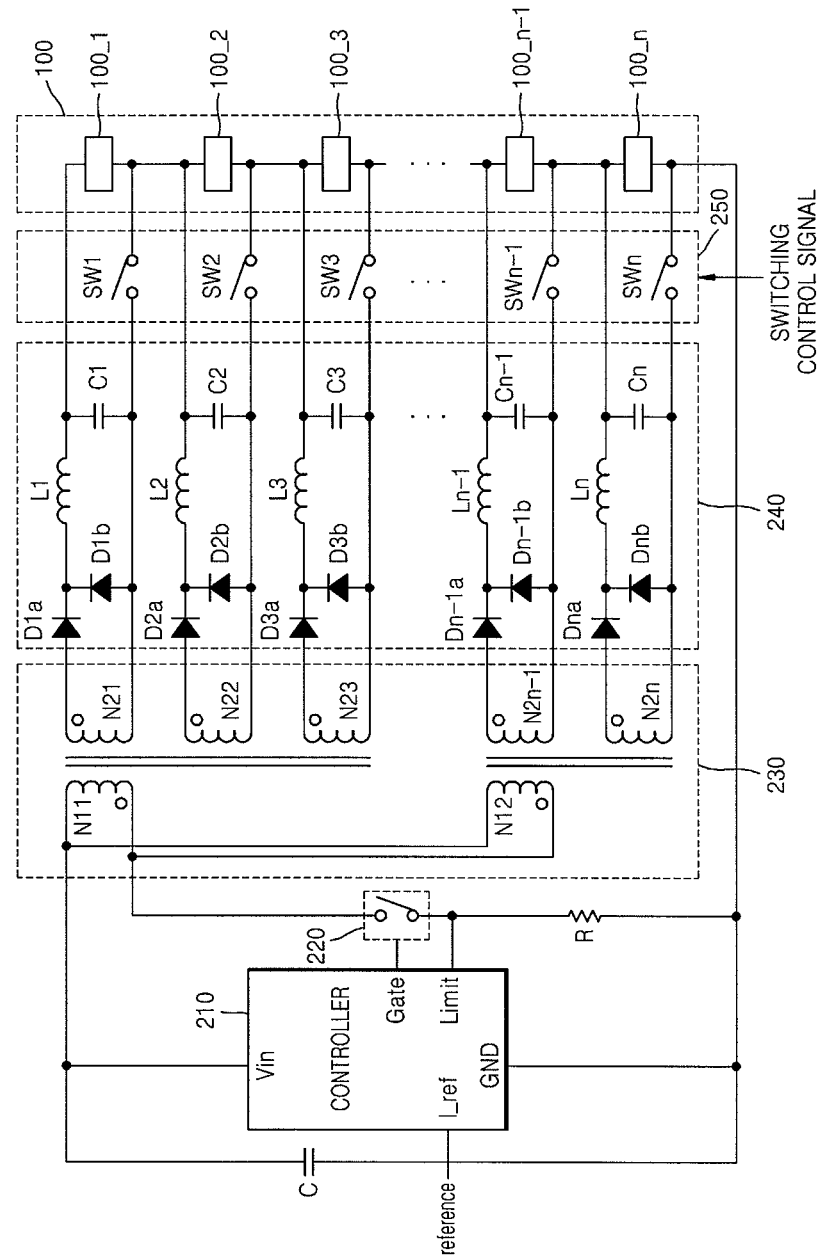
FIG. 8 is a circuit diagram illustrating a voltage variation compensation circuit according to another embodiment.

FIG. 8 is a circuit diagram illustrating a voltage variation compensation circuit according to another embodiment. A multi-output transformer 230 of FIG. 8 includes two first coils N11 and N12 connected to the first switching unit 220 in parallel. The rest of the description of the voltage variation compensation circuit of FIG. 8 is similar to that presented above.

To achieve voltage balance of all cells or trays using a conventional multi-output converter, even if a turn ratio is the same when coupling coefficients between inputs are different, different voltages are output. Thus, it is difficult to balance voltages of cells or trays. However, when an input current is controlled using a flyback or forward transformer in a multi-output converter, and a current is applied only to a selected cell or tray, a desired amount of power may be charged in each cell or tray even if each output and each input have different coupling coefficients. Thus, a voltage may be compensated for with respect to a cell or tray where a voltage variation occurs.

While various aspects have been particularly shown and described with reference to exemplary embodiments, it will be understood by those of ordinary skill in the art that various changes in form and details may be made therein without departing from the spirit and scope of the invention. The exemplary embodiments should be considered in descriptive sense only and not for purposes of limitation. Features or aspects of each embodiment should typically be considered as available as options for other features or aspects in other embodiments.

What is claimed is:

1. A battery system, comprising:
    a plurality of battery cells; and
    a battery cell balancing unit, configured to adjust voltages across each of the battery cells to reduce variation among the voltages across the battery cells, the battery cell balancing unit comprising:
        a controller configured to receive a DC reference current and to generate an AC current based on the DC reference current,
        a transformer comprising an input coil configured to receive the AC current, and an output coil coupled to the input coil,
        a rectifier circuit comprising a rectifier connected to the output coil, and
        a switching unit comprising a plurality of switches, each configured to selectively connect the rectifier to one of the battery cells.

2. The battery system of claim 1, wherein the transformer comprises a plurality of output coils coupled to the input coil, and the rectifier circuit comprises a plurality of rectifiers, each connected to one of the output coils.

3. The battery system of claim 1, wherein the transformer comprises a plurality of input coils configured to receive the AC current, and a plurality of output coils, each coupled to one of the input coils, wherein the rectifier circuit comprises a plurality of rectifiers, each connected to one of the output coils.

4. The battery system of claim 3, wherein the input coils are serially connected.

5. The battery system of claim 4, wherein each of the rectifiers comprises:
    an inductor;
    first and second diodes connected to the inductor; and
    a capacitor connected to the inductor.

6. The battery system of claim 3, wherein the input coils are connected in parallel.

7. The battery system of claim 6, wherein each of the rectifiers comprises:
    an inductor;
    first and second diodes connected to the inductor; and
    a capacitor connected to the inductor.

8. The battery system of claim 2, wherein each of the rectifiers comprises:
    an inductor;
    first and second diodes connected to the inductor; and
    a capacitor connected to the inductor.

9. The battery system of claim 1, further comprising a battery management system (BMS), configured to provide the reference current to the battery cell balancing unit.

10. The battery system of claim 9, wherein the AC current is provided to the transformer by the controller according to a state of a switch controlled by a signal from the controller.

11. The battery system of claim 9, wherein the reference current is a variable current.

12. The battery system of claim 1, wherein the switching unit receives a switching control signal from a battery management system.

13. An energy storage system, comprising:
    a battery system, comprising:
        a plurality of battery cells, and
        a battery cell balancing unit, configured to adjust voltages across each of the battery cells to reduce variation among the voltages across the battery cells, the battery cell balancing unit comprising:
            a controller configured to receive a DC reference current and to generate an AC current based on the DC reference current,
            a transformer comprising an input coil configured to receive the AC current, and an output coil coupled to the input coil,
            a rectifier circuit comprising a rectifier connected to the output coil, and
            a switching unit comprising a plurality of switches, each configured to selectively connect the rectifier to one of the battery cells; and
    a power conversion system, comprising a controller, configured to charge the battery system with power from either a power generation system or a grid, and to discharge the battery system by providing power from the battery system to a load.

14. The energy storage system claim 13, wherein the transformer comprises a plurality of output coils coupled to the input coil, and the rectifier circuit comprises a plurality of rectifiers, each connected to one of the output coils.

15. The energy storage system claim 13, wherein the transformer comprises a plurality of input coils configured to receive the AC current, and a plurality of output coils, each coupled to one of the input coils, wherein the rectifier circuit comprises a plurality of rectifiers, each connected to one of the output coils.

16. The energy storage system claim 15, wherein the input coils are serially connected.

17. The energy storage system claim 16, wherein each of the rectifiers comprises:
an inductor;
first and second diodes connected to the inductor; and
a capacitor connected to the inductor.

18. The energy storage system claim 15, wherein the input coils are connected in parallel.

19. The energy storage system claim 18, wherein each of the rectifiers comprises:
an inductor;
first and second diodes connected to the inductor; and
a capacitor connected to the inductor.

20. The energy storage system claim 14, wherein each of the rectifiers comprises:
an inductor;
first and second diodes connected to the inductor; and
a capacitor connected to the inductor.

21. The energy storage system claim 13, further comprising a battery management system (BMS), configured to provide the reference current to the battery cell balancing unit.

22. The energy storage system claim 21, wherein the AC current is provided to the transformer by the controller according to a state of a switch controlled by a signal from the controller.

23. The energy storage system claim 21, wherein the reference current is a variable current.

24. The energy storage system claim 13, wherein the switching unit receives a switching control signal from a battery management system.

* * * * *